(12) United States Patent
Alasia et al.

(10) Patent No.: US 7,551,752 B2
(45) Date of Patent: Jun. 23, 2009

(54) SYSTEMS AND METHODS FOR AUTHENTICATING OBJECTS USING MULTIPLE-LEVEL IMAGE ENCODING AND DECODING

(75) Inventors: Alfred V. Alasia, Lake Worth, FL (US); Alfred J. Alasia, Royal Palm Beach, FL (US); Thomas C. Alasia, Lake Worth, FL (US); Slobodan Cvetkovic, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 644 days.

(21) Appl. No.: 11/197,625

(22) Filed: Aug. 4, 2005

(65) Prior Publication Data
US 2006/0029278 A1    Feb. 9, 2006

Related U.S. Application Data

(60) Provisional application No. 60/600,027, filed on Aug. 9, 2004, provisional application No. 60/565,300, filed on Apr. 26, 2004.

(51) Int. Cl.
G06K 9/00    (2006.01)
(52) U.S. Cl. .................. 382/100; 382/190; 382/232

(58) Field of Classification Search ............... 382/100, 382/245, 232, 236, 233, 251, 190; 235/494, 235/487; 238/901; 324/300, 309, 307, 487, 324/494; 345/469.1; 348/E5.099, E5.086, 348/E5.441, E5.445; 375/E7.001, E7.026, 375/E7.211, 240, 240.08, 240.01, 240.12, 375/E7.126, E7.132, E7.144, E7.076, E7.081, 375/E7.224, E7.226, E7.229, E7.231, E7.243, 375/E7.248, E7.252, E7.146, E7.148, E7.104, 375/E7.109, E7.111, E7.27, E7.268, E7.267; 360/53, 39, 48; 358/1.9, 539, 518; 380/54, 380/55; 283/72, 74, 113; 359/2, 19; 705/57, 705/62; 707/E17.009
See application file for complete search history.

(56) References Cited

U.S. PATENT DOCUMENTS

| | | |
|---|---|---|
| 3,524,395 A | 8/1970 | Alasia |
| 3,635,778 A | 1/1972 | Rice et al. |
| 3,642,346 A | 2/1972 | Dittmar |
| 3,784,289 A | 1/1974 | Wicker |
| 3,937,565 A | 2/1976 | Alasia |
| 4,092,654 A | 5/1978 | Alasia |
| 4,198,147 A | 4/1980 | Alasia |
| 4,303,307 A | 12/1981 | Tureck et al. |
| 4,715,623 A | 12/1987 | Roule et al. |
| 4,914,700 A | 4/1990 | Alasia |
| 5,027,401 A | 6/1991 | Soltesz |
| 5,113,213 A | 5/1992 | Sandor et al. |
| 5,178,418 A | 1/1993 | Merry et al. |
| 5,195,435 A | 3/1993 | Morrone et al. |
| 5,303,370 A | 4/1994 | Brosh et al. |
| 5,396,559 A | 3/1995 | McGraw |
| 5,438,429 A | 8/1995 | Haeberli et al. |
| 5,606,609 A | 2/1997 | Houser et al. |

| | | | |
|---|---|---|---|
| 5,708,717 A | 1/1998 | Alasia | |
| 5,735,547 A | 4/1998 | Morelle et al. | |
| 5,830,609 A | 11/1998 | Warner et al. | |
| 5,904,375 A | 5/1999 | Brugada | |
| 5,960,081 A | 9/1999 | Vynne et al. | |
| 5,974,150 A | 10/1999 | Kaish et al. | |
| 6,084,713 A | 7/2000 | Rosenthal | |
| 6,104,812 A | 8/2000 | Koltai et al. | |
| 6,171,734 B1 | 1/2001 | Warner et al. | |
| 6,216,228 B1 | 4/2001 | Chapman et al. | |
| 6,222,650 B1 | 4/2001 | Long | |
| 6,222,887 B1 | 4/2001 | Nishikawa et al. | |
| 6,252,963 B1 | 6/2001 | Rhoads | |
| 6,256,150 B1 | 7/2001 | Rosenthal | |
| 6,280,891 B2 | 8/2001 | Daniel et al. | |
| 6,343,138 B1 | 1/2002 | Rhoads | |
| 6,362,869 B1 * | 3/2002 | Silverbrook | 355/18 |
| 6,414,794 B1 | 7/2002 | Rosenthal | |
| 6,496,591 B1 | 12/2002 | Rhoads | |
| 6,542,618 B1 | 4/2003 | Rhoads | |
| 6,757,406 B2 | 6/2004 | Rhoads | |
| 6,827,282 B2 * | 12/2004 | Silverbrook | 235/494 |
| 6,983,048 B2 * | 1/2006 | Alasia et al. | 380/54 |
| 7,114,750 B1 * | 10/2006 | Alasia et al. | 283/72 |
| 7,321,968 B1 * | 1/2008 | Capellaro et al. | 713/152 |
| 2001/0005570 A1 | 6/2001 | Daniel et al. | |
| 2002/0008380 A1 | 1/2002 | Taylor et al. | |
| 2002/0042884 A1 | 4/2002 | Wu et al. | |
| 2002/0054680 A1 | 5/2002 | Huang et al. | |
| 2002/0185857 A1 | 12/2002 | Taylor et al. | |
| 2003/0012374 A1 | 1/2003 | Wu et al. | |
| 2003/0012562 A1 | 1/2003 | Lawandy et al. | |
| 2003/0015866 A1 | 1/2003 | Cioffi et al. | |
| 2003/0136837 A1 | 7/2003 | Amon et al. | |
| 2003/0137145 A1 | 7/2003 | Fell et al. | |
| 2005/0018845 A1 | 1/2005 | Suzaki | |

FOREIGN PATENT DOCUMENTS

| | | |
|---|---|---|
| EP | 0598357 B1 | 5/1994 |
| EP | 1147912 A2 | 10/2001 |
| GB | 1407065 | 9/1975 |
| WO | WO 92/04692 | 3/1992 |
| WO | WO 93/15491 | 8/1993 |
| WO | WO 94/07326 | 3/1994 |
| WO | WO 98/15418 | 4/1998 |
| WO | WO 01/87632 A1 | 11/2001 |

OTHER PUBLICATIONS

International Search Report, PCT Application No. PCT/US05/28092, dated Aug. 5, 2005, 3 pages.

International Search Report, PCT Application No. PCT/US2005/013069, dated Jun. 26, 2007, 4 pages.

* cited by examiner

*Primary Examiner*—Sheela C Chawan
(74) *Attorney, Agent, or Firm*—Hunton & Williams, LLP

(57) ABSTRACT

A method of producing a digital multiple-level encoded image is presented. The method comprises obtaining a digital authentication image, obtaining a first encoding parameter set comprising one or more encoding parameters, and constructing a first encoded image. The first encoded image is constructed using a first encoding methodology, the digital authentication image and the first encoding parameter set. The method further comprises obtaining a second encoding parameter set comprising one or more encoding parameters and constructing a second encoded image using a second encoding methodology, the first encoded image and the second encoding parameter set. The second encoded image may be decoded to reveal the first encoded image using a decoder having characteristics corresponding to at least a portion of the encoding parameters of the second encoding parameter set. The first encoded image may be decoded to reveal the authentication image using a decoder having characteristics corresponding to at least a portion of the encoding parameters of the first encoding parameter set.

17 Claims, 7 Drawing Sheets

SYSTEMS AND METHODS FOR AUTHENTICATING OBJECTS USING MULTIPLE-LEVEL IMAGE ENCODING AND DECODING

CROSS-REFERENCE TO RELATED APPLICATIONS

This application claims priority to U.S. Provisional Application No. 60/600,027, filed Aug. 9, 2004 and to U.S. application Ser. No. 11/068,350 ('350 application) filed Feb. 28, 2005, which claims priority to U.S. Provisional Application No. 60/565,300, filed Apr. 26, 2004, both of which are incorporated herein by reference in their entirety. The application is also related to U.S. application Ser. No. 10/847,962 ('962 application) filed May 18, 2004 and U.S. application Ser. No. 10/897,943 ('943 application) filed May 18, 2004, each of which is incorporated herein by reference in its entirety.

BACKGROUND OF THE INVENTION

The invention relates generally to the field of object security authentication, and more particularly to the use of encoded images for authentication of documents and other objects.

Document falsification and product counterfeiting are significant problems that have been addressed in a variety of ways. One of the more successful approaches has been the use of latent or hidden images applied to or printed on objects to be protected. These images are generally not viewable without the assistance of specialized devices that render them visible.

One approach to the formation of a latent image is to optically encode the image so that, when printed, the image can be viewed only through the use of a corresponding decoding device. Such graphical encoded images may be used on virtually any form of printed document including legal documents, identification cards and papers, labels, currency, stamps, etc. They may also be applied to goods or packaging for goods subject to counterfeiting.

Objects to which a graphical encoded image is applied may be authenticated by decoding the encoded image and comparing the decoded image to an expected authentication image. The authentication image may include information specific to the object being authenticated or information relating to a group of similar objects (e.g., products produced by a particular manufacturer or facility). Production and application of encoded images may be controlled so that they cannot easily be duplicated. Further, the encoded image may be configured so that tampering with the information on the document or label is readily apparent.

The effectiveness of using graphical encoded images to prevent counterfeiting or unauthorized production of documents and other products may depend on the security of the software and the encoding parameters used to encode an authentication image. It can also depend on controlling access to the system that applies the final encoded image to the objects to be authenticated. Unauthorized knowledge of the encoding parameters or the authentication image used to produce an encoded image may make it possible to duplicate the encoded image and apply it to non-authentic goods or documents.

As a consequence, measures must be taken to assure the security of the encoding process and to make the process difficult or impossible to reverse engineer or duplicate.

SUMMARY OF THE INVENTION

An aspect of the present invention provides a method of producing a digital multiple-level encoded image. The method comprises obtaining a digital authentication image, obtaining a first encoding parameter set comprising one or more encoding parameters, and constructing a first encoded image. The first encoded image is constructed using a first encoding methodology, the digital authentication image and the first encoding parameter set. The method further comprises obtaining a second encoding parameter set comprising one or more encoding parameters and constructing a second encoded image using a second encoding methodology, the first encoded image and the second encoding parameter set. The second encoded image may be decoded to reveal the first encoded image using a decoder having characteristics corresponding to at least a portion of the encoding parameters of the second encoding parameter set. The first encoded image may be decoded to reveal the authentication image using a decoder having characteristics corresponding to at least a portion of the encoding parameters of the first encoding parameter set.

Another aspect of the present invention provides a method of decoding a digital multiple-level encoded image produced by constructing a first digital encoded image using a first encoding methodology, an authentication image and a first encoding parameter set, then constructing a second digital encoded image using a second encoding methodology, the first encoded image and a second encoding parameter set. The method comprises decoding the second digital encoded image to reveal the first digital encoded image using at least a portion of the second encoding parameter set. The method further comprises decoding the first digital encoded image to reveal the authentication image using at least a portion of the first encoding parameter set.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
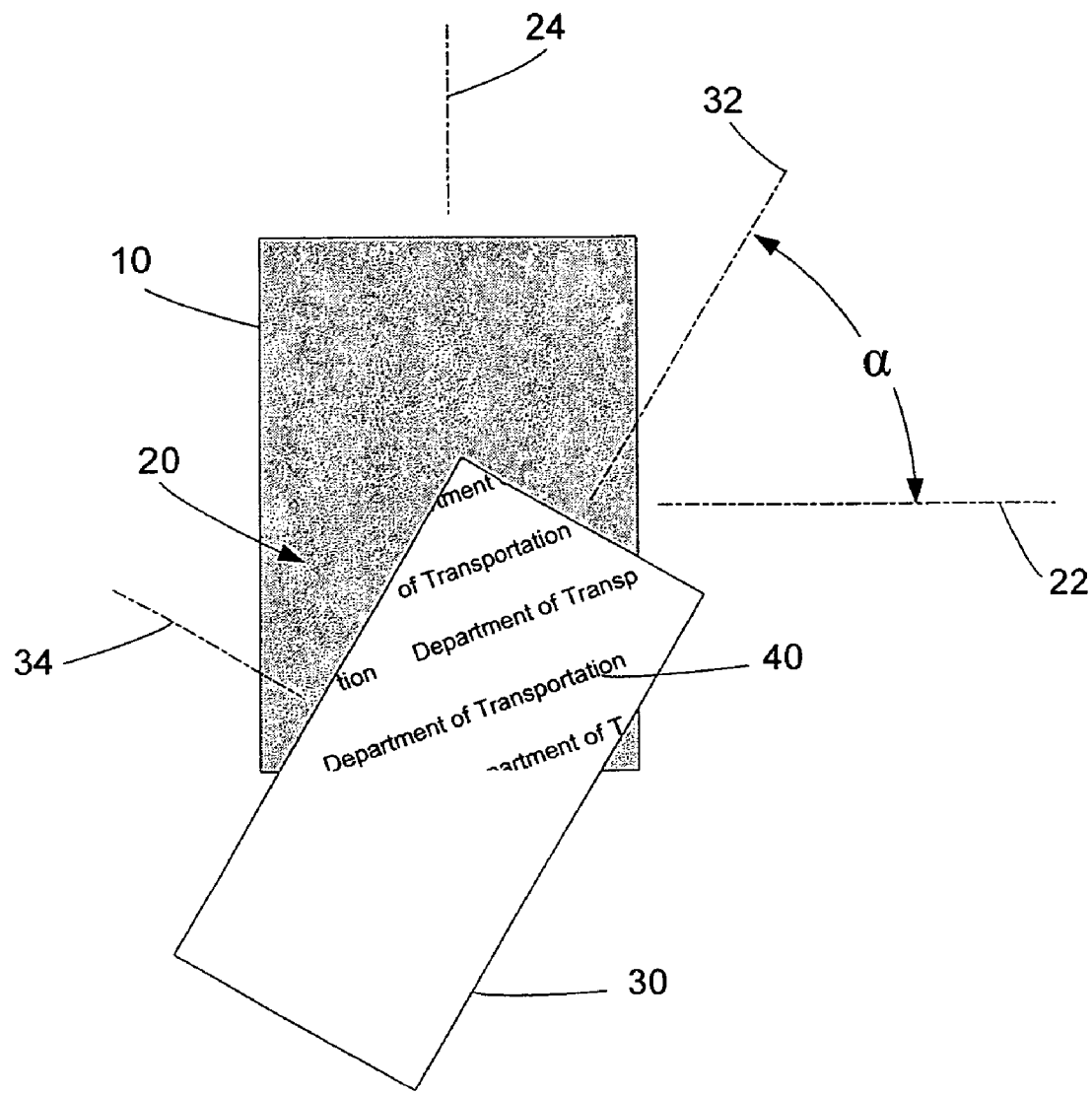
FIG. 1 is a an illustration of the use of an optical decoding device to decode a printed graphical encoded image.

Embodiments of the present invention relate to methods for the protection of documents and other items using visually or graphically encoded images. These images are typically embedded in a background or source image and printed on items that may be subject to alteration, falsification or counterfeiting. As used herein, the terms "graphical encoded image" and "encoded image" refer to an image produced by manipulating and/or hiding a first image within a background field or within a second image using an encoding methodology and a set of encoding parameters. The encoded image is produced in such a way that when applied or printed, the first image cannot be discerned by the human eye without the use of a decoding device. Some encoded images include latent images that are hidden so that their presence is difficult to discern from a background or primary image. Other encoded images include content that is easily visible but not readable because it has been systematically scrambled or otherwise manipulated.

The present invention provides for sequentially applying one or more encoding methodologies to an authentication image to produce a multiple-level encoded image. Each encoding step may be conducted using a different encoding methodology and/or different encoding parameters so that the resultant encoded image cannot be completely decoded to reveal the authentication image by using a single decoding element or a single decoding pass through a software-based decoder.

It will be understood by those of ordinary skill in the art that, as used herein, the term "encoded image" may apply to a printed or otherwise applied image or to a digital image that has been created by a data processor or captured from a printed image using a digital camera or other image acquisition device.

Encoded images of particular significance to the present invention are those that are configured to be optically decoded using a lens-based decoding device. Such images take advantage of the ability of certain types of lenses (e.g., a lenticular lens) to sample image content based on the their optical characteristics. For example, a lenticular lens can be used to sample and magnify image content based on the lenticule frequency of the lens. The images used are typically encoded by one of several methods that involve establishing a regularized periodic pattern having a frequency corresponding to that of the lenticular lens to be used as a decoder, then introducing distortions of the pattern that correspond to the content of the image being encoded. These distortions may be made so small as to render the image difficult to discern from the regularized pattern by the naked eye. Encoded images of this type can be produced in an analog fashion using specialized photographic equipment as disclosed in U.S. Pat. No. 3,937,565 or digitally as is disclosed in U.S. Pat. No. 5,708,717 ('717 patent), both of which are incorporated herein by reference in their entirety.

As discussed in detail in the '350 application, optically encoded images may also be decoded using a software-based decoding device. Such a device applies one or more decoding algorithms to a digital encoded image using the encoding parameters with which the image was encoded. The output is a digital decoding result that can be compared to the original authentication image or from which information can be extracted for comparison to known or otherwise determined information about a particular object to which the encoded image was applied.

Digitally encoded images can be embedded into a background or into other images so that the mere presence of the encoded image is difficult to discern. With reference to FIG. 1, an encoded image 10 may be established using a primary or source image 20 and a secondary image 40 which is embedded into the primary image 20 in such a way that the secondary image 40 can only be viewed with a decoding device 30 of a predetermined frequency. The primary image may be a blank gray or colored background image as in the encoded image 10 of FIG. 1 or may include visible image content such as a design or photograph or any other form of indicia. The secondary image may also be any form of image or indicia and may include indicia related in some way to the primary image. In the example encoded image 10, the secondary image 40 is a repeating pattern based on the words "Department of Transportation." The secondary image can be separately encoded then merged or embedded into the primary image or the process of embedding may be accomplished in such a way that the secondary image is encoded as it is embedded. As shown in FIG. 1, the secondary image may be viewed by placing the decoding device 40 over the encoded image 10 at the correct orientation. In the example of FIG. 1, the decoding device has a horizontal axis 32 and a vertical axis 34 and the encoded image 10 has a horizontal axis 22 and a vertical axis 24. The secondary image 40 is revealed when the horizontal axis 32 of the decoding device 30 is oriented at the decoding angle $\alpha$ with respect to the horizontal axis 22 of the encoded image 10. The decoding angle $\alpha$ is an encoding parameter that is established prior to encoding and embedding the secondary image.

The methods by which the secondary image is embedded or merged with the primary image can be divided into two general approaches. In the first approach, a regularized periodic behavior is imposed on the primary image using a predetermined frequency. This is primarily accomplished by rasterizing the primary image at the predetermined frequency. The secondary image is then mapped to the primary image so that the regularized behavior of the primary image can be altered at locations corresponding to those in the secondary image that include image content. The alterations are small enough that they are difficult for the human eye to discern. However, when a lenticular lens having a frequency corresponding to the predetermined frequency is placed over the primary image, it will sample and magnify the primary image content in such a way that the alterations are brought out to form the latent secondary image.

In the second approach, the regularized periodic behavior is first imposed on the secondary image rather than the primary image, with alterations in that behavior occurring wherever there is content in the secondary image. The secondary image is then mapped to the primary image and the content of the primary image altered pixel by pixel based on the content of the encoded secondary image.

Figure 2:
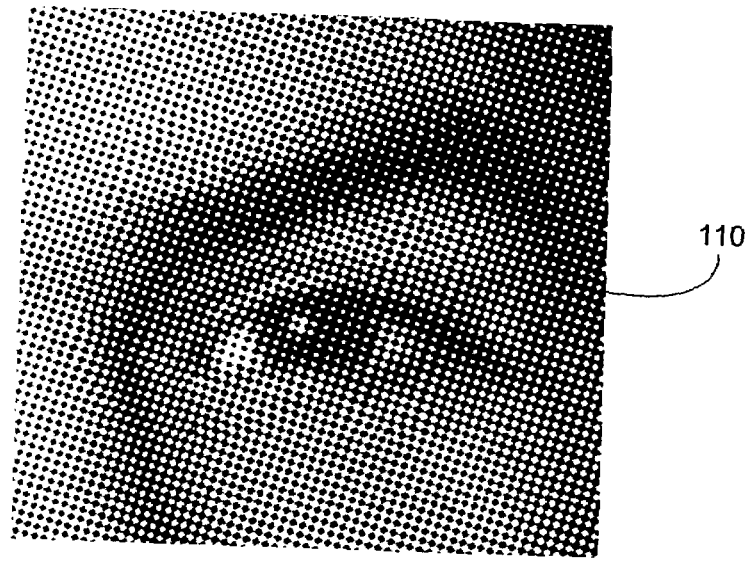
FIG. 2 is an illustration of an exemplary rasterized encoded image formed from primary and secondary images using a raster shifting method.
Figure 3:
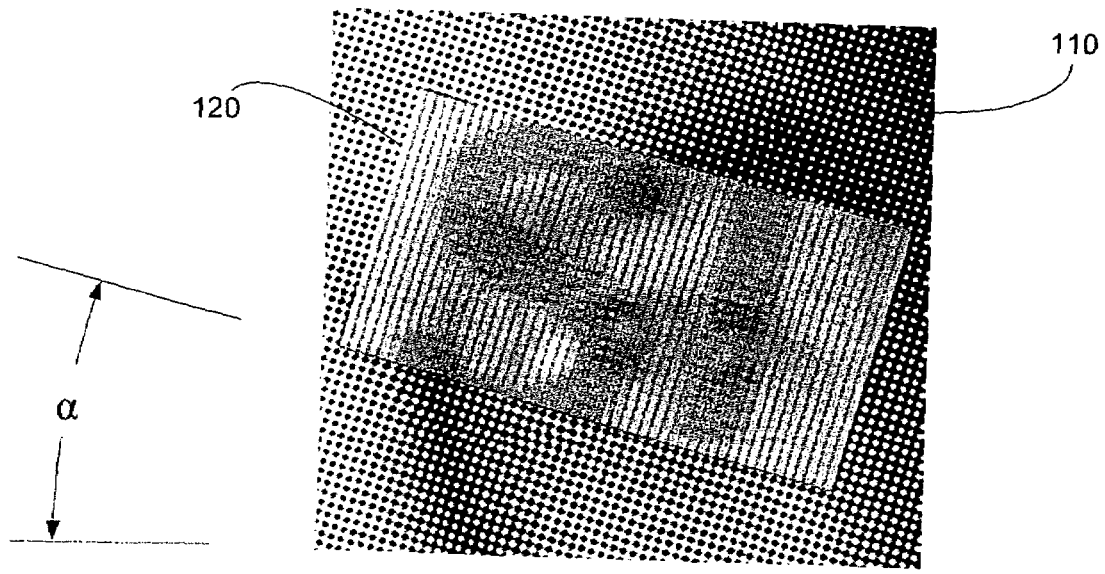
FIG. 3 is an illustration of the use of an optical decoder to decode the encoded image of FIG. 2.

Examples of the above approaches will now be discussed in more detail. A simple example of the first approach is illustrated in FIGS. 2-3. FIG. 2 shows an enlarged view of an optically encoded image 110. The encoded image 110 was constructed from a primary image of a human face and a secondary image of the letters "SI." The primary image was rasterized at a particular frequency and raster angle $\alpha$. The secondary image was embedded into the primary image by introducing position variations (shifting) in the raster elements at locations corresponding to the content of the secondary image. These shifts can be made small enough that it is difficult if not impossible for the naked eye to interpret them as a cohesive image embedded in the primary image. The higher the raster frequency, the more difficult it is to distinguish the shifts and/or discern the embedded image. The presence of the shifts can be further disguised by making the transition from an unshifted raster portion of the image to a shifted portion as gradual and smooth as possible. The result, as shown in FIG. 2 is an encoded image 110 in which the primary image is readily viewed but the secondary image cannot easily be discerned. As shown in FIG. 3, when a lenticular decoding lens 120 having a line frequency corresponding to the raster element frequency is placed over the encoded image 110 at the correct orientation (i.e., the raster angle α), the secondary image (the letters "SI") may be viewed.

The presence of the embedded image may be further disguised by compensating for changes in the tone density of small regions or windows of the primary image. This can be accomplished by modifying the individual pixels in the shifted image so that the average tone density of each window remains the same as the corresponding window of the unshifted image.

It will be understood by those of ordinary skill in the art that the above method may be used with any form of dot, symbol or line rasterization methodology. Further, this and other methods may be used to embed multiple secondary images having different encoding parameters as described in the co-pending '962 and '943 applications).

The method described above can be regarded as a special case of a method disclosed in the '717 patent. In that method, the secondary image is encoded first using the scrambling methodology described in the '717 patent and the raster lines of the primary image are then reformed to follow the pattern of the encoded secondary image. The resulting embedded image can be viewed using a lenticular decoding device having the same frequency at which the primary image was rasterized and with which the secondary image was encoded.

The second general approach for embedding a secondary image into a primary image may be used if it is desired for the output image to be a continuous tone image (as opposed to the rasterized image produced by the first approach). In this method, a secondary image is embedded into a "blank" control image having no content other than regular periodic tonal variations. The control image with the embedded secondary image is then mapped to the primary image.

Figure 4:
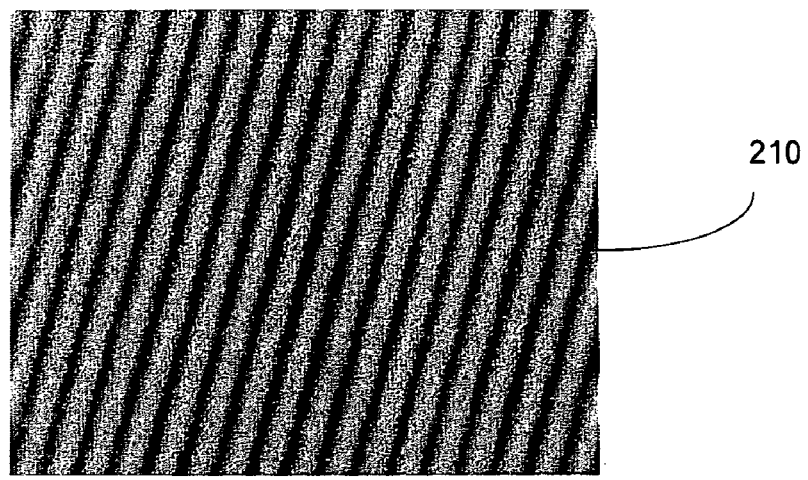
FIG. 4 is an illustration of a blank control image having periodically varying tone density.
Figure 5:
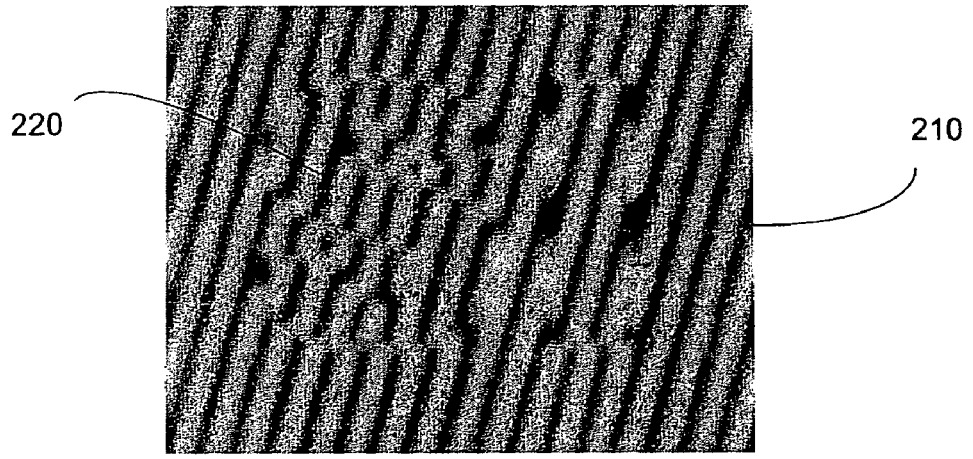
FIG. 5 is an illustration of the control image of FIG. 4 with a secondary image embedded therein.
Figure 6:
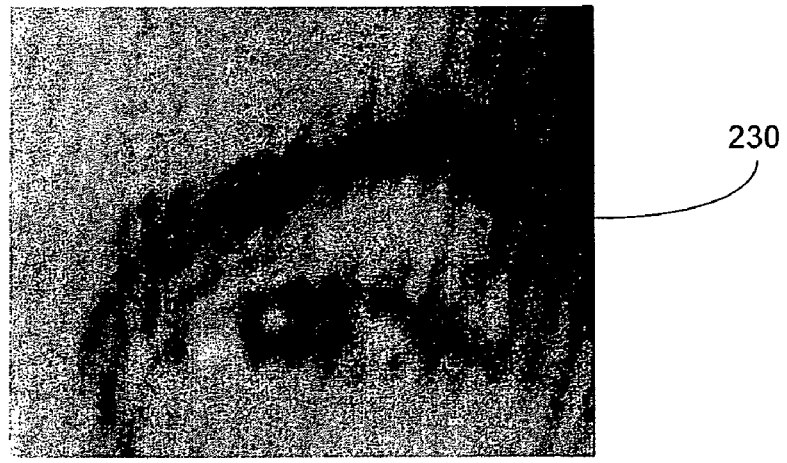
FIG. 6 is an encoded image formed from a primary image and the control image of FIG. 5.

With reference to FIGS. 4-6, a simple example of this method will now be discussed. FIG. 4 shows a blank control image 210 in which the tonal values of pixels of the image change as a periodic function, such as a square wave, sine wave, triangle wave etc. The frequency of this function matches the frequency of the lenticular decoding lens. The angular orientation of the periodic variation establishes the angle used to decode the encoded image. As shown in FIG. 5, a secondary image 220 is embedded into the control image 210 by shifting the phase of the periodic function at any location corresponding to a content location in the secondary image. In this way, the deviations in the regularized tone variations in the modified control image 210 correspond to the content of the secondary image.

The modified control image 210 is then mapped pixel by pixel to a primary image 230. Pixels of the primary image 230 are lightened or darkened to match the pattern of tonal variations of the corresponding pixels in the control image 210. The final encoded image is shown in FIG. 6. The actual amount of lightening or darkening of the primary image pixels may be determined using transformation functions, usually defined as lookup tables. These functions may differ depending on the image application. For example, the transformation functions may be designed specifically for use with a specific printing process (e.g. ink jet, dye sublimation, laser printing).

It will be understood by those of ordinary skill in the art that the above method may be used to embed multiple secondary images using different encoding parameter sets as described in the co-pending '962 and '943 applications. Each of the secondary images can then be independently decoded by a decoder corresponding to the associated encoding parameter set using. This approach should not be confused with the multiple-level encoded images of the present invention which require sequential decoding of each level of encoded image. It will be understood, however, that any given level of encoded image produced according to the methods of the present invention can incorporate multiple secondary images.

The output of any of the above methods may be a printed encoded image (i.e., a combined primary and latent secondary image printed on a document or other item) or may be a digital encoded image that may be transmitted, embedded in a digital document or stored for later use.

Another method of embedding an image is commonly used in banknotes and checks. In this method, a latent image is created by changing the direction of raster elements in the visible images at positions corresponding to the content in the hidden image. For example, vertical raster lines in the primary image may be changed to horizontal lines at the locations corresponding to the latent image. The latent image can typically be seen by tilting the banknote slightly. However, the deviations in the primary image can also be decoded using an optical decoder. This is because the raster lines of the primary image will run along the length of the lenticular line of the decoder at the positions where there is no hidden content, but will have only a cross section at the positions where there is a hidden content. This difference makes the hidden image appear much brighter than the visible when viewed through the decoder.

The common thread of all of the above graphical encoding methods and their resulting encoded images is that they involve deviations from regular periodic behavior (e.g., spatial location, tone density, raster angle). The regular periodic behavior and the deviations therefrom may be established based on the encoding methodology used and a predetermined set of encoding parameters. The deviations are made apparent through the use of a decoder having characteristics that correspond to one or more of the encoding parameters. For example, one of the encoding parameters may be the frequency of the regular periodic behavior. The decoder (whether hardware or software-based) must be configured according to that frequency. For example, in the case of a lenticular lens, the lens frequency is established so that the frequency of the regular periodic behavior is equal to the lens frequency or an even multiple of the lens frequency. The lenticular lens may then act as a content sampler/magnifier that emphasizes the deviations from the regularized behavior and assembles them into the secondary image.

In addition to the optical encoding methodologies discussed above, other methods that may be used in conjunction with the present invention may include symbological encoding and digital encoding methods such as digital watermarking. It will be understood that the nature of the encoding parameters associated with a particular encoding methodology will depend, at least in part, on the nature of the encoding methodology. Examples of encoding parameters for a rasterization method may include resolution or frequency of the image and the orientation at which a decoding lens would need to be positioned to reveal the authentication image (decoding angle). Another example would be an indicator that would determine a particular type of rasterization. Such a rasterization type parameter may be used to determine, for example, whether an image is to be rasterized using dots, lines, diamonds, elliptical dots, or some other geometric form. Further, each rasterization type may involve specific characteristics that could also be used as encoding parameters. These could include, for example, the degree of elongation of diamonds and elliptical dots, etc. Encoding parameters may also include values relating to the geometry, position and orientation of the authentication image when viewed through the decoder. Encoding parameters could also include such variables as print resolution or a repetition factor or frequency used to generate a wallpaper pattern from the authentication indicia.

As discussed in the '943 application, a single encoded image may be constructed from an encoding parameter set having one or more encoding parameters generated or selected by the user and one or more additional encoding parameters that are generated or selected by a non-user or selected automatically without user input. As noted above, a single encoded image may also be constructed from multiple authentication images, each having its own associated encoding parameter set. In these embodiments, some or all of the encoding parameter set for a first authentication image may be selected or generated by the user, while some or all of the encoding parameters for a second authentication image may be selected or generated by a non-user or selected automatically without user input.

The characteristics of an encoded image may be tied to a particular object or group of objects. For example, the encoding parameters used to encode the image may be uniquely or semi-uniquely determined based on object identification or characteristics or, in the case of a document, informational or graphical content. Encoded image characteristics may also be established based on circumstance surrounding the production of the object or the construction/application of the encoded image.

The methods of the present invention provide an enhancement to the previously known encoding methodologies including those described above. In the method of the present invention, a first digital encoded image is produced using at least one authentication image and a first encoding parameter set using a first encoding methodology. The first encoded image may also include a first background or source image into which the authentication image is encoded and embedded using the encoding parameters of the first encoding parameter set. The first digital encoded image is then used with a second encoding parameter set and a second encoding methodology to produce a second digital encoded image. The second digital encoded image may include a second background or source image into which the first digital encoded image is embedded. The second digital encoded image may be stored, applied to on object or transmitted. The second digital encoded image may also be used with yet another (i.e., third) encoding parameter set and a third encoding methodology to produce a third encoded image. It will be understood that at each level of encoding, the encoded image of the previous level is effectively an "authentication image" for use in producing the current encoded image. Thus, these intermediate encoded images may be used to authenticate a particular level of the overall encoded image.

Figure 7:
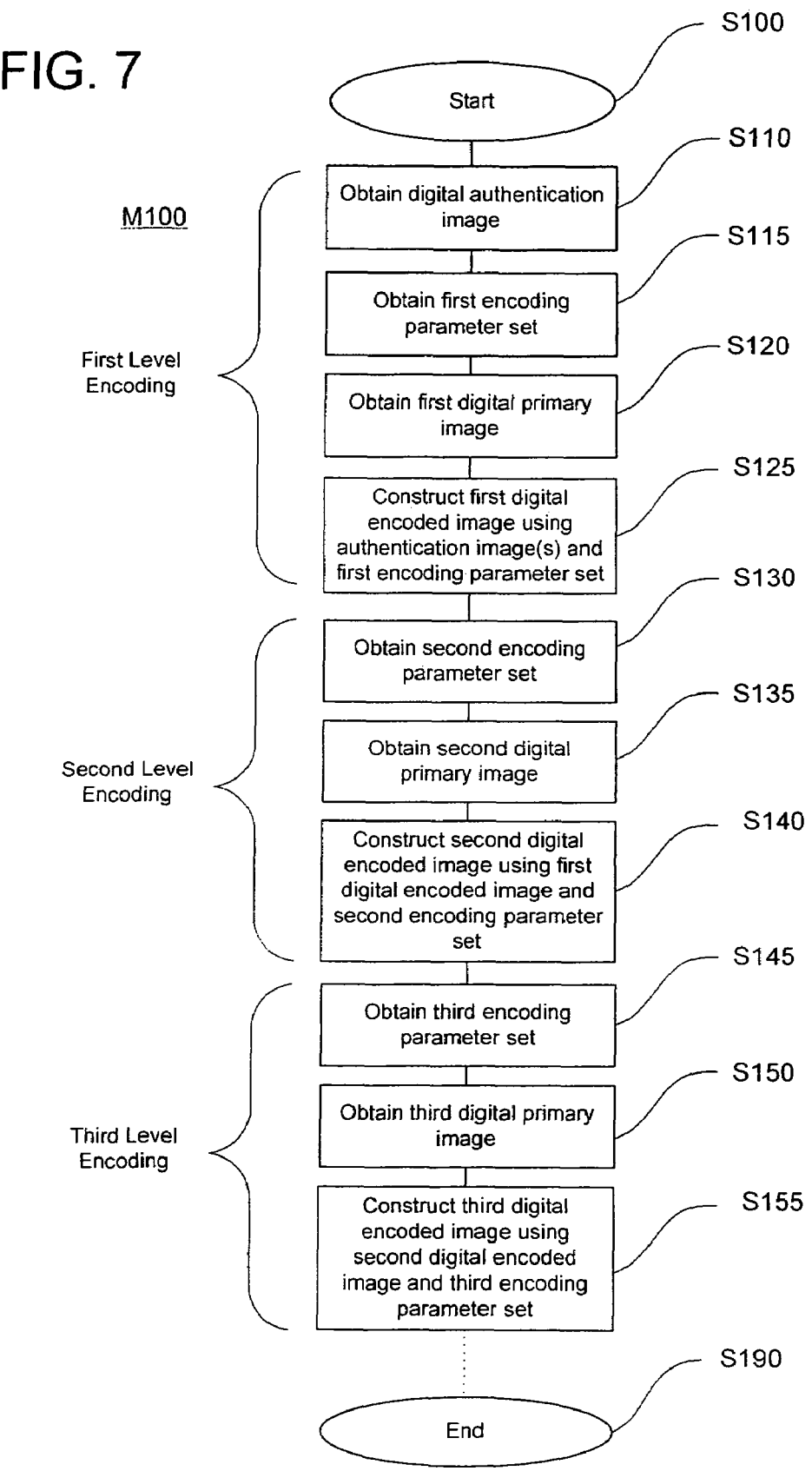
FIG. 7 is a flowchart of a method of constructing a digital multiple-level encoded image according to an embodiment of the invention.

FIG. 7 is a flow chart of a method M100 for producing a multiple level encoded image according to an embodiment of the invention. The method begins at S100. At S110, a digital authentication image is obtained. The authentication image is an image that will be produced when the final multiple level encoded image is decoded. The digital authentication image may be received from a separate provider or retrieved from storage. Alternatively, the digital authentication image may be created from scratch or produced by scanning a desired graphical image.

The authentication image may include authentication indicia which may be any visual representation including but not limited to digitized images, computer-generated graphics and text strings from document processing programs. Authentication indicia may be selected so as to provide information about the source of an object or about the user. For example, authentication indicia may include an image of a corporate logo or textual identification of a government agency. Alternatively, or in addition, authentication indicia may include information relating to the specific object to be authenticated. Authentication indicia for a specific document could, for example, include text from the document itself, or text relating to the circumstances of the generation of the document. Authentication indicia may also include a textual representation of the circumstances relating to the current authentication process. If, for example, the authentication method is carried out at the time of printing of a particular document, the authentication indicia could include a textual representation of a time and date to be associated with the document. Alternatively, or in addition, the authentication indicia may include information relating to a processor or station at which the document is generated, processed or printed.

From the above, it will be understood by those of ordinary skill in the art, that the authentication image may be made unique to a particular object or group of objects or may be generic to a particular user. In yet another alternative, the authentication image may be established by a licensor or provider of authentication software with or without input from the user.

A first encoding parameter set is obtained at S115. As previously discussed, encoding parameters may be used to determine the characteristics of the encoded image and/or the appearance of the authentication image when the encoded image is decoded. Like the authentication image, the encoding parameter set may be received from a separate provider or retrieved from storage. The encoding parameter set may also be assembled from encoding parameters provided by multiple sources as described in the '943 application. For example, individual encoding parameters may be user-provided or non-user-provided. User-provided encoding parameters may be supplied by the user interactively or may be supplied and stored for later use by the software. Non-user-provided encoding parameters may be pre-programmed into encoding software or retrieved from data storage. Non-user-supplied encoding parameters may also be calculated or determined by the software as a function of a processing circumstance or based on a random selection. A processing circumstance could include, for example, the time at which the encoded image is generated or characteristics of the operating environment (e.g., characteristics or identification of the processor generating the document).

Including an encoding parameter that is not controllable by the user provides protection against misuse by a particular user. Non-user-supplied encoding parameter(s) may be set by a software licensing or control entity or may be set by an administrator of the user's organization. As discussed above, the non-user-supplied encoding parameter(s) may also be constructed by the software without input from the user.

Depending on the encoding methodology being used, a source or primary image may be obtained at S120. The source image is a visible background or image into which the encoded authentication image is embedded. The primary image may be a blank background image as in the encoded image 10 of FIG. 1 or may include visible image content such as a design or photograph as in the encoded image 110 of FIG. 2. As with the authentication image, the primary image may be received from a separate provider, retrieved from storage or digitally created.

At S125, a first digital encoded image is constructed using the digital authentication image and the first encoding parameter set. As noted above, any method for creating an encoded image from the authentication image may be used. Depending on the method, the encoded authentication image may be embedded into the first primary image to produce the first digital encoded image. If the first digital encoded image is printed, the first primary image would be visible with the naked eye. The authentication image, however would not be viewable unless decoded with a decoder having characteristics associated with the first encoding parameter set.

The first digital encoded image represents the first level of a multiple-level encoded image. A second level may be constructed using a second encoding parameter set obtained at S130 and, if desired and depending on the encoding methodology to be used, a second primary image at S135. In this second level encoding process, the authentication image is replaced by the first encoded image, which is re-encoded using the second parameter set at S140. The re-encoded first encoded image may be embedded into the second primary image to produce the second encoded image. Significantly, the encoding methodology used in the second level encoding process need not be the same methodology as that used in the first level encoding process.

If the second digital encoded image is printed, only the second primary image would be visible with the naked eye. If a decoder having the appropriate characteristics associated with the second encoding parameter set is applied to the second digital encoded image, the first primary image could be viewed. The authentication image, however, would remain unviewable unless decoded using a decoder having the appropriate characteristics associated with the first encoding parameter set.

It can thus be seen that, if the second encoded image is to be decoded using hardware-based optical decoding, two lens elements would be required. One lens element having optical characteristics corresponding to the first encoding parameter set and a second lens element having optical characteristics corresponding to the second encoding parameter set. The authentication image could be viewed only by superimposing the two lenses one on top of the other. This could be accomplished using two entirely separate lenses or using a composite lens such as those described in U.S. patent application Ser. No. 10/165,162, filed Jun. 6, 2002, which is incorporated herein by reference in its entirety.

A printed version of the second decoded image could also be decoded by capturing (e.g., by scanning) a digital version of the printed encoded image and decoding the captured image using a digital (i.e., software-based) decoder. The digital decoder would be configured to first decode the second level encoding using the second encoding parameter set and a decoding methodology appropriate for the encoding methodology used in the second encoding process. The output of this first decoding pass would then be used as the input to a second decoding pass in which the first encoding parameter set would be used with a decoding methodology appropriate for the encoding methodology used in the second encoding process. The output of the second decoding pass would include the authentication image.

A digital decoder could also be used to decode a second digital encoded image that had never been printed at all. The second digital encoded image would simply used in place of the captured version of the printed image.

As shown in FIG. 7, the method M100 may include a third encoding level in which a third encoding parameter set is obtained at S145, an optional third digital primary image is obtained at S150 and a third encoded image is constructed at S155. It will be readily understood that when the third digital image is printed, only the third primary image would be visible with the naked eye. If a decoder having the appropriate characteristics associated with the third encoding parameter set is applied to the printed encoded image, the second primary image could be viewed. Using a second decoder (or a second decoding pass in a digital decoder) and the second encoding parameter set allows the first primary image to be viewed and using a third decoder (or a third pass in a digital decoder) and the first encoding parameter set allows the authentication image to be viewed.

The method M100 ends at S190. It will be understood, however, additional steps may be included in the method M100. In particular, any number of encoding levels may be used to produce a final multiple-level encoded image. In order to achieve high quality results, however, it may be necessary to tailor the encoding parameters to the encoding level. For example, the raster frequency of the encoding process may be increased with each level of encoding. In a particular application of the invention, the frequency may be doubled with each encoding level to assure that enough details from the previous level are captured to preserve the encoded information.

Once a digital multiple-level encoded image has been constructed, it may be stored, transmitted to a requestor or applied to an object. Alternatively, the digital multiple-level encoded image may be inserted directly into a digital document. The document containing the encoded image may then be further processed, transmitted or printed. It will be understood that the encoded image is graphically embedded within the document so that it is printed simultaneously with the document. When the document is printed, the printed multiple-level encoded image will be produced in its encoded form so that it cannot be viewed except with the corresponding decoding devices.

Figure 8:
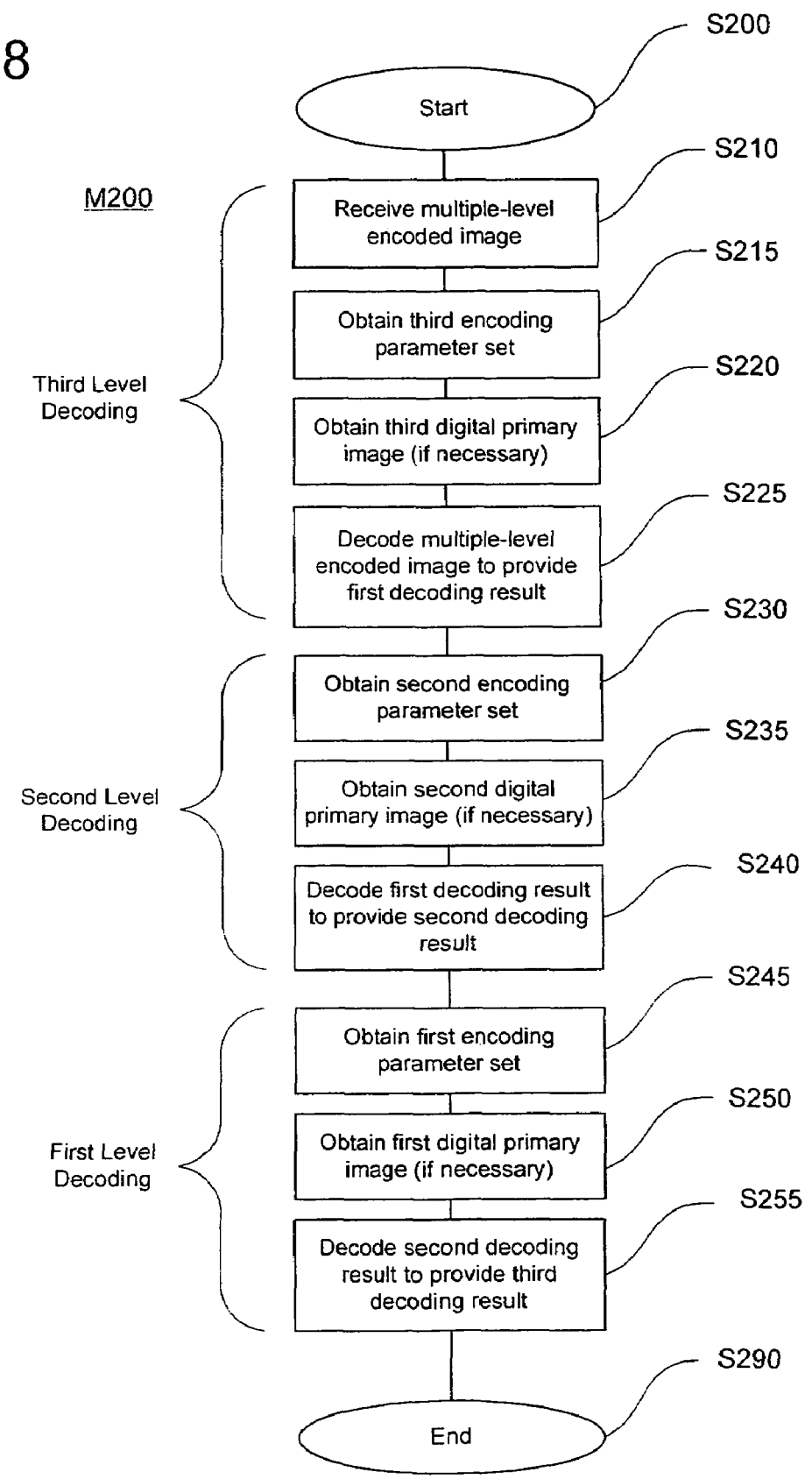
FIG. 8 is a flowchart of a method of decoding a digital multiple-level encoded image according to an embodiment of the invention.

It may not always be practical to use multiple hardware decoder elements to decode an encoded image with three more encoding levels. A software decoder, however, can be adapted to decode a multiple-level encoded image as easily as a single-level encoded image. An illustrative decoding method M200 that may be used in conjunction with a digital decoder is shown in FIG. 8. As illustrated, the method M200 is set up for a three level digital encoded image. It will be understood, however, that the method M200 may be adapted for digital images having any number of encoding levels.

The method M200 begins at S200. At S210, the multiple-level encoded image is received. The multiple-level encoded image may be received from a separate provider or retrieved from storage. The multiple-level encoded image may be an original, unprinted digital image or may be a captured digital version of a printed encoded image. At S215, the third encoding parameter set (i.e., the encoding parameter set used in the third level encoding process) is obtained, either by receipt from a separate provider or by retrieval from storage.

As is discussed in the '350 application, some digital decoding methods may require knowledge of the primary image into which a secondary image has been embedded. If the decoding methodology to be used to decode the third level of the multiple-level encoded image has such a requirement, the primary image may be obtained at S220. The third level of the of the multiple-level encoded image is decoded at S225 using the third encoding parameter set and, if necessary, the third digital primary image to produce a first decoding result.

The first decoding result is then used as the input to the second level decoding process. The second encoding parameter set is obtained at S230 and, if necessary, the second digital primary image is obtained at S235. The second level of the of the multiple-level encoded image is decoded at S240 using the second encoding parameter set and, if necessary, the second digital primary image to produce a second decoding result. As was noted above, the encoding methodology used at the various encoding levels may differ. Similarly, the decoding methodology used at various decoding levels may vary and, in particular, may be adapted to the encoding method used at each level. Thus, the digital decoding methodology used to decode the second level encoded image need not be the same as the decoding methodology used to decode the third level encoded image.

The second decoding result may be used as the input to the first level decoding process. The first encoding parameter set is obtained at S245 and, if necessary, the first digital primary image is obtained at S250. The first level of the of the multiple-level encoded image is then decoded at S240 using the first encoding parameter set and, if necessary, the first digital primary image to produce a third decoding result, which comprises a decoded version of the authentication image. The method ends at S290.

An aspect of the above-described decoding methods is that an encoded image having multiple encoding levels may be decoded using a combination of hardware and software decoders. For example, a printed encoded image having first and second encoding levels produced using an optical encoding methodology may be decoded by a combination of a lens decoder keyed to the encoding parameters of the second encoding level and a digital decoder provided with the encoding parameters of the first encoding level. This may be accomplished by orienting a lens element over the encoded image so as to render the first encoded image viewable. A digital image of the first encoded image as viewed through the lens element is captured using an image acquisition device such as a scanner or digital camera. The digital image is then decoded using a digital decoder to which the encoding parameters for the first encoded image has been provided. The decoding result provides the authentication image used to encode the first encoded image.

The actions of the encoding and decoding methods of the invention may be distributed among multiple actors, thereby making them particularly suitable for hierarchical authentication and security arrangements. For example, by restricting the access of a potential decoding entity to the encoding parameters for one encoding level, that entity is prevented from fully decoding the multiple-level encoded image. In a hierarchical system, the lowest level inspectors may be given access to the decoding parameters for only the highest encoding level, which may be sufficient for first tier authentication of an object.

In some embodiments of the invention, layers of security may be added by different entities through which the encoded image is passed. Each such entity could re-encode the encoded image with its own encoding parameter set and/or primary image. In this way, the path of an object such as a document can be retraced through a series of generation or transmission steps, each such step having an associate re-encoding of the encoded image.

Figure 9:
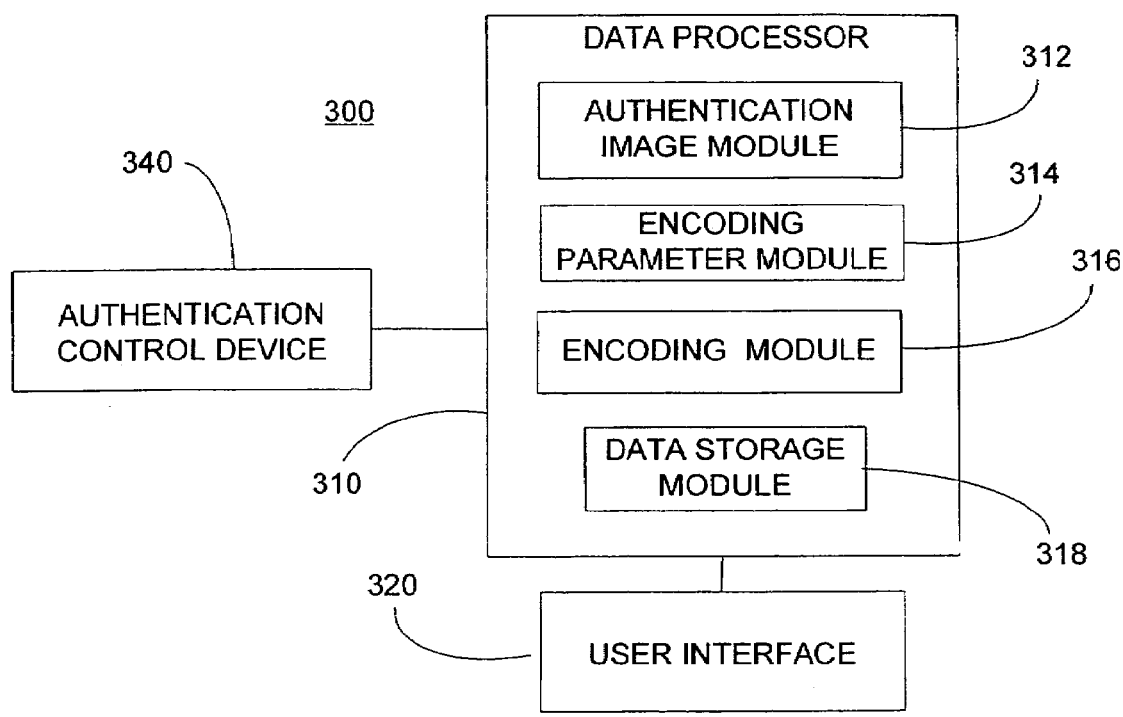
FIG. 9 is a schematic representation of a system for constructing digital multiple-level encoded images according to an embodiment of the invention.

The encoding methods of the invention may be carried out using any automated data processing system. With reference to FIG. 9, a data processing system 300 for constructing multiple-level encoded images may include a data processor 310 connected to a user interface 320 and a printer (not shown) or other device for applying an image to an object. The data processor 310 may be programmed with software adapted for carrying out the methods of the invention. In an illustrative embodiment, the data processor 310 may include an authentication image module 312 that receives or generates authentication indicia and, if necessary renders the indicia to form one or more digital authentication images. The authentication indicia and/or encoding parameters may be received from the user via the user interface 320, retrieved from an internal data storage module 318 or received from a separate processor or data storage server over a network to which the data processor 310 is selectively connected.

The data processor 310 may also include an encoding parameter module 314 that receives and/or assembles encoding parameter sets for use in encoding and re-encoding the digital authentication image(s). An encoding module 316 may be programmed to use any of one or more encoding methods, the encoding parameters of a first encoding parameter set and a digital authentication image to construct a first encoded image. The encoding module 316 may be further programmed to incorporate a primary image into the first encoded image. The encoding module 316 may be further programmed to re-encode the first encoded image to construct a digital multiple-level encoded image using additional encoding parameter sets and primary images as previously described. The encoding parameter sets and primary images used may be stored in the data storage module 318 in a database record associated with the object or group of objects to which the multiple-level encoded image is to be applied. This association assures that the necessary encoding parameters and images can be retrieved for use in decoding the multiple-level encoded image. The digital multiple level encoded image may also be stored in the data storage module 318, transmitted to a requester via a network connection or printed or applied to an object using a printer or other device.

The automated system 300 may also include a control device 340 that may be used to control the use of the data processor 310 or the encoding software installed on the data processor 310. The control device 340 may be a separate processor, module or data storage device from which the encoding software may obtain authentication indicia, encoding parameters or data relating to a processing circumstance.

It will be understood that the data processing system 300 may comprise a single processor or, alternatively, may comprise a plurality of processors and/or servers interconnected by a network or networks. The functions of the individual modules of the processing system 300 may also be distributed among a plurality of processors.

Figure 10:
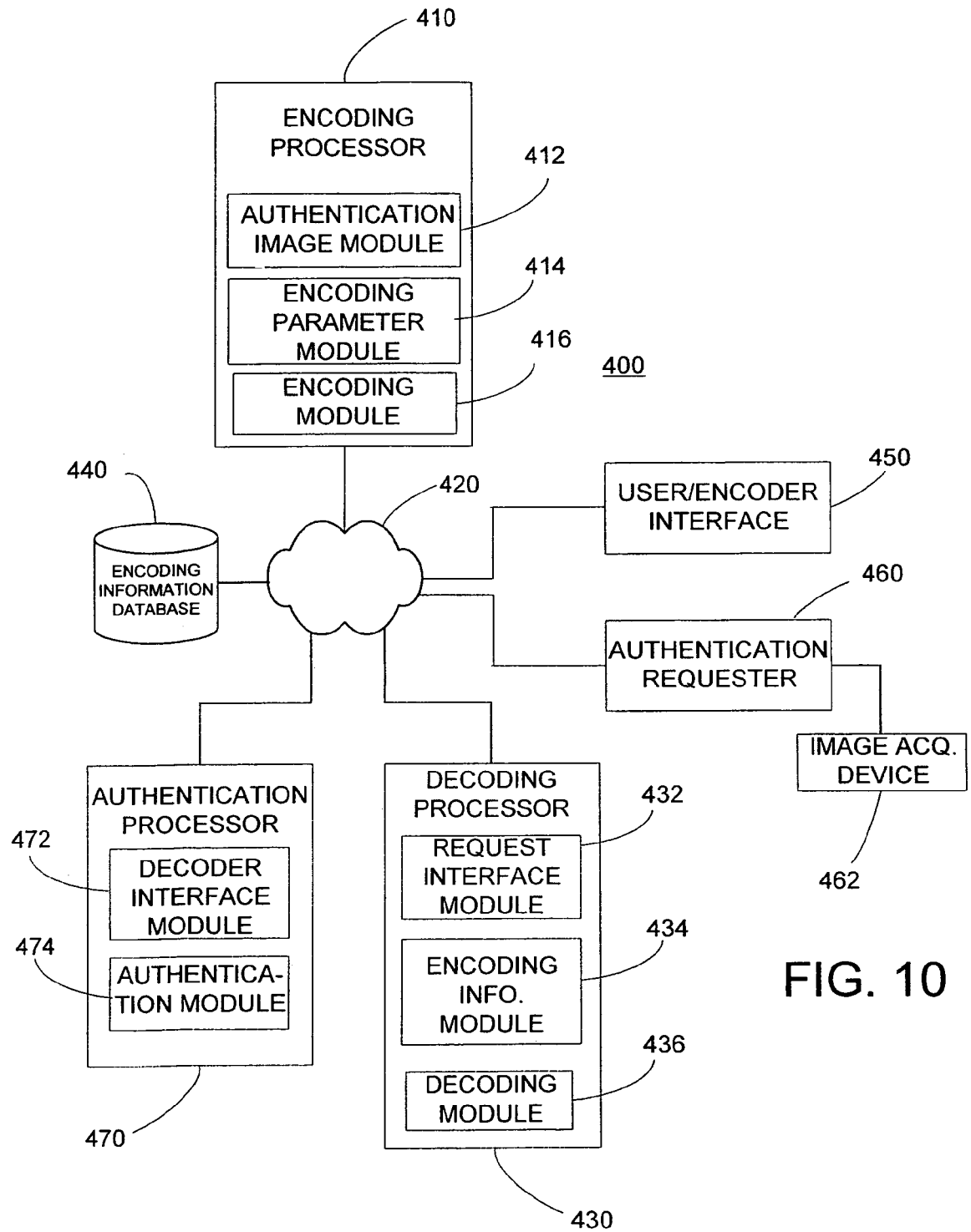
FIG. 10 is a schematic representation of a system for authenticating an object.

With reference to FIG. 10, a system 400 for authenticating an object includes an encoding processor 410 configured to generate digital multiple level encoded images and a decoding processor 430 configured to decode digital multiple level encoded images. The encoding processor 410 may include an authentication image module 412, an encoding parameter module 414 and an encoding module 416, all of which any or all of which may be in communication with an encoding information database 440. The encoding module 416 is adapted or programmed for producing a multiple level encoded image using an authentication image provided by the authentication image module 412 and encoding parameter sets provided by the encoding parameter module 414. The encoding module 416 may also use primary images for embedding the encoded images at various encoding levels. The authentication image or indicia included therein, any primary images and/or some or all of the encoding parameters may be received from an encoded image requester 450 adapted to provide an interface between a user and the encoding processor 410. The authentication image or indicia included therein, any primary images and/or some or all of the encoding parameters may also be retrieved from the encoding information database 440 or other data storage module.

The encoding module 416 may store the authentication image and the encoding parameter sets for each encoding level in the encoding information database 440 for later use in decoding a digital image in which the multiple level encoded image is expected to be found. The encoding module 416 may also store the multiple level encoded image in the database 440, cause the multiple level encoded image to be applied to an object and/or return the encoded image to the encoded image requester 450. In some embodiments, the multiple level encoded image may be embedded into a digital document which can then be stored or returned to the encoded image requester 450.

The decoding processor 430 may include a decoding request interface 432, an encoding information module 434 and a decoding module 436. The decoding request interface 432 is adapted for receiving requests for decoding and/or authenticating a digital image expected to include a multiple level encoded image. The decoding request interface 432 may be configured for receiving this request from an authentication requester 460. The request may include the digital multiple level encoded image and any or all of the encoding parameters for one or more of the encoding levels used to produce the encoded image. It will be understood that the digital multiple level encoded image may be a digitally produced image that has not been printed or may be a captured digital image obtained by using a scanner, digital camera or other digital image acquisition device 462.

The decoding processor 430 may further include an encoding information module 434 configured for obtaining the encoding parameters and, if necessary, the primary images used to produce the multiple level encoded image expected to be found in the digital image associated with the request. Some or all of the encoding parameters and/or primary images may be retrieved from the encoding information database 440 or derived from information received with the decoding request. The encoding information module 434 assembles the information required for decoding each encoding level and passes it to a decoding module 436. The decoding module 436 may be adapted for carrying out the multiple decoding methodology described above to sequentially decode any or all of the decoding levels of the multiple level encoded image. After each decoding stage, the decoding result may be stored, returned to the authentication requester 460 or provided to another authorized requester.

The decoding module 436 may also forward the decoding result from a particular decoding stage to an authentication processor 470 for comparison to an expected decoding result. The authentication processor 470 may include a decoder interface module 472 adapted for receiving decoding results from the decoding processor 430. The interface module 472 may also be adapted for receiving encoding information from the decoding processor or for retrieving such information from the encoding information database. The encoding information may include the authentication image and/or any primary images used to encode the expected multiple level encoded image. These images may be used by an authentication module 474 adapted for comparing the encoding results received from the decoding processor 430 to expected decoding results. In particular, the authentication module may be adapted for comparing the authentication image to a final decoding result for purposes of authenticating the digital image that has been decoded.

The authentication module 474 may also be adapted to extract content from the decoding result, such content being then comparable to authorization criteria or to content extracted directly from a digital document to which the multiple-level encoded image was applied. The authentication module 474 may include OCR software or bar-code interpretation software, which can be used to extract information from the decoding result and/or the digital document.

It will be understood that the encoding processor 410, the decoding processor 430 and the authentication processor 470 may actually be a single data processor or server or may be distributed among a plurality of data processors in selective communication via a network 420. It will further be understood that the encoding processor 410 and the decoding processor 430 may comprise multiple processors and that the encoding and decoding of various levels may be carried out on the same or different processors. In a particular embodiment, each stage of encoding is carried out by a different processor. This allows the encoding information used at each level to be held by a different encoding entity.

General aspects of possible implementation of the inventive technology will now be described. Various method and operating system embodiments of the inventive technology are described above. It will be appreciated that the systems of the invention or portions of the systems of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As previously discussed, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It will be understood that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, It will be understood that each of the processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, It will be understood that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, a telecommunications network (e.g., a cellular or wireless network) or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

It will be understood that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, C#, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a magnetic stripe, a laser card, a smart card, a processor chip, a memory chip, a DVD, an integrated circuit, a hard disk, a floppy disk, an optical disk, a flash memory card, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, telephone (landline, cellular or wireless), voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A method of decoding a digital multiple-level encoded image produced by constructing a first digital encoded image using a first encoding methodology, an authentication image and a first encoding parameter set, then constructing a second digital encoded image using a second encoding methodology, the first encoded image and a second encoding parameter set, the method comprising:
    decoding the second digital encoded image to reveal the first digital encoded image using at least a portion of the second encoding parameter set; and
    decoding the first digital encoded image to reveal the authentication image using at least a portion of the first encoding parameter set.

2. A method according to claim 1 wherein the digital multiple-level encoded image has been applied to an object and wherein the action of decoding the second digital encoded image includes:
    placing a first lens element over the applied multiple-level encoded image so that the applied multiple-level encoded image is viewable therethrough, the first lens element having optical characteristics corresponding to the at least a portion of the second encoding parameter set.

3. A method according to claim 2 wherein the first lens element is a lenticular lens element comprising a plurality of lenticules uniformly spaced to establish a lens frequency, and wherein the first encoding parameter set includes an encoding frequency, the encoding frequency being a multiple of the lens frequency.

4. A method according to claim 2 wherein the action of decoding the first digital encoded image includes:
    placing a second lens element over the applied multiple-level encoded image in registry with the first lens element so that the applied multiple-level encoded image is viewable therethrough, the second lens element having optical characteristics corresponding to the at least a portion of the first encoding parameter set.

5. A method according to claim 4 wherein the second lens element is a lenticular lens element comprising a plurality of lenticules uniformly spaced to establish a lens frequency, and wherein the second encoding parameter set includes an encoding frequency as an encoding parameter, the encoding frequency being a multiple of the lens frequency.

6. A method according to claim 1 wherein the digital multiple-level encoded image has been applied to an object and the actions of decoding the first and second digital encoded images are carried out by placing a multi-section decoder lens over the applied multiple-level encoded image, the multi-section decoder comprising a first lens element having optical characteristics corresponding to the at least a portion of the second encoding parameter set and a second lens element having optical characteristics corresponding to the at least a portion of the first encoding parameter set.

7. A method according to claim 6 wherein the first lens element is a lenticular lens element comprising a plurality of lenticules uniformly spaced to establish a first lens frequency and the second lens element is a lenticular lens element comprising a plurality of lenticules uniformly spaced to establish a second lens frequency, and wherein the at least a portion of the first encoding parameter set includes a first encoding frequency that is a multiple of the second lens frequency and the at least a portion of the second encoding parameter set includes a second encoding frequency that is a multiple of the first lens frequency.

8. A method according to claim 1 wherein the action of decoding the second digital encoded image is carried out using a digital decoder and includes:
    receiving the digital multiple-level encoded image;
    obtaining the at least a portion of the second encoding parameter set; and
    applying at least one digital decoding methodology to the digital multiple-level encoded image using the at least a portion of the second encoding parameter set to produce a first decoding result.

9. A method according to claim 8 wherein the action of decoding the first digital encoded image is carried out using the digital decoder and includes:
    obtaining the at least a portion of the first encoding parameter set; and
    applying at least one digital decoding methodology to the first decoding result using the at least a portion of the first encoding parameter set to produce a second decoding result.

10. A method according to claim 1 wherein
    the digital multiple-level encoded image has been applied to an object,
    the action of decoding the second digital encoded image includes placing a first lens element over the applied multiple-level encoded image so that the applied multiple-level encoded image is viewable therethrough, the first lens element having optical characteristics corresponding to the at least a portion of the second encoding parameter set, and
    the action of decoding the first digital encoded image is carried out using the digital decoder and includes:
        capturing a digital image of the first digital encoded image as decoded by the first lens element,
        obtaining the at least a portion of the first encoding parameter set, and applying at least one digital decoding methodology to the captured digital image using the at least a portion of the first encoding parameter set to produce a decoding result.

11. A system for decoding a digital multiple-level encoded image formed by encoding a digital authentication image using a first encoding parameter set to produce an encoded image and re-encoding the encoded image a predetermined number of times in sequence, each re-encoding level being accomplished using a different additional encoding parameter set a final re-encoding level providing the digital multiple-level encoded image, the system comprising:

an encoding information module adapted for obtaining the first encoding parameter set and all additional encoding parameter sets used to produce the digital multiple-level encoded image; and a decoding module in communication with the encoding information module, the decoding module being adapted for applying at least one digital decoding methodology to the digital multiple-level encoded image, the at least one digital decoding methodology being repeatable to decode each re-encoding level in reverse sequence beginning with the final re-encoding level using the appropriate encoding parameter for each re-encoding level.

12. A system according to claim 11 further comprising:

a decoding request module adapted for receiving the digital multiple-level encoded image from a decoding requester along with a request to decode the digital multiple-level encoded image.

13. A system according to claim 11 further comprising:

a digital image acquisition device adapted for capturing the digital multiple-level encoded image from a version of the multiple-level encoded image applied to an object.

14. A system for authenticating an object expected to have applied thereto a multiple-level encoded image formed by encoding a digital authentication image using a first encoding parameter set to produce an encoded image and re-encoding the encoded image a predetermined number of times in sequence, each re-encoding level being accomplished using a different additional encoding parameter set a final re-encoding level providing the digital multiple-level encoded image, the system comprising:

an encoding information database configured for storage of the digital authentication image, the first encoding parameter set and all additional encoding parameter sets used to produce the digital multiple-level encoded image; and a decoding processor in selective communication with the encoding information database over a first network, the decoding processor being adapted for receiving from a decoding requester over a second network a request to decode a digital test image, receiving the digital test image, retrieving from the encoding information database the encoding parameter sets used to produce the digital multiple-level encoded image, and applying to the digital test image at least one decoding methodology, the at least one decoding methodology being repeated a number of times equal to one plus the number of times the encoded image was re-encoded, thereby producing a decoding result.

15. A system according to claim 14 further comprising:

an authentication processor in selective communication with the decoding processor and the encoding information database over the first network, the authentication processor being adapted for retrieving the digital authentication image from the encoding information database, receiving the decoding result from the decoding processor and comparing the decoding result to authentication indicia appearing in the digital authentication image to determine an authentication result.

16. A system according to claim 15 wherein the authentication processor is further adapted to transmit the authentication result to an authentication result requester over a third network.

17. A system according to claim 16 where any one of the first, second and third networks may be the same network as one or both of the remaining networks.

* * * * *